(12) United States Patent
Badding et al.

(10) Patent No.: US 8,685,589 B2
(45) Date of Patent: *Apr. 1, 2014

(54) FUEL CELLS WITH ENHANCED VIA FILL COMPOSITIONS AND/OR ENHANCED VIA FILL GEOMETRIES

(75) Inventors: Michael E Badding, Campbell, NY (US); Jacqueline L Brown, Lindley, NY (US); Thomas D Ketcham, Big Flats, NY (US); Susan L Schiefelbein, Ithaca, NY (US); Dell J St Julien, Watkins Glen, NY (US); Raja R Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1406 days.

This patent is subject to a terminal disclaimer.

(21) Appl. No.: 12/075,497

(22) Filed: Mar. 12, 2008

(65) Prior Publication Data

US 2008/0160376 A1 Jul. 3, 2008

Related U.S. Application Data

(63) Continuation of application No. 10/422,356, filed on Apr. 24, 2003, now Pat. No. 7,378,173, and a continuation-in-part of application No. 09/858,124, filed on May 15, 2001, now Pat. No. 6,623,881.

(60) Provisional application No. 60/205,273, filed on May 18, 2000.

(51) Int. Cl.
*H01M 8/10* (2006.01)

(52) U.S. Cl.
USPC ........... 429/482; 429/431; 429/457; 429/495; 429/486

(58) Field of Classification Search
USPC .......................... 429/431, 482, 486, 457, 495
See application file for complete search history.

(56) References Cited

U.S. PATENT DOCUMENTS

| 4,648,945 | A | 3/1987 | Isenberg |
| 4,861,345 | A | 8/1989 | Bowker et al. |
| 5,089,455 | A | 2/1992 | Ketcham et al. |
| 5,190,834 | A | 3/1993 | Kendall |
| 5,273,837 | A | 12/1993 | Aitken et al. |
| 5,298,138 | A | 3/1994 | Nachles et al. |
| 5,338,623 | A | 8/1994 | Nachlas et al. |

(Continued)

FOREIGN PATENT DOCUMENTS

| EP | 0993059 B1 | 12/2001 |
| JP | 03-067468 | 3/1991 |

(Continued)

OTHER PUBLICATIONS

"High-Temperature Fuel Cells Part 2: The Solid Oxide Cell," Chemtech, 21:120-126 (1991).

(Continued)

*Primary Examiner* — Patrick Ryan
*Assistant Examiner* — Alex Usyatinsky
(74) *Attorney, Agent, or Firm* — Svetlana Short (57) ABSTRACT

A fuel cell and method for manufacturing the fuel cell are described herein. Basically, the fuel cell is formed from an electrode/electrolyte structure including an array of anode electrodes and cathode electrodes disposed on opposing sides of an electrolyte sheet, the anode and cathode electrodes being electrically connected in series, parallel, or a combination thereof by electrical conductors that traverse via holes in the electrolyte sheet. Several different embodiments of electrical conductors which have a specific composition and/or a specific geometry are described herein.

20 Claims, 7 Drawing Sheets

(56) References Cited

U.S. PATENT DOCUMENTS

| | | | |
|---|---|---|---|
| 5,479,700 A | 1/1996 | Nachlas et al. | |
| 5,750,279 A | 5/1998 | Carolan et al. | |
| 5,925,477 A | 7/1999 | Ledjeff et al. | |
| 5,985,113 A | 11/1999 | Crome et al. | 204/286 |
| 6,183,897 B1 | 2/2001 | Hartvigsen et al. | |
| 6,187,157 B1 | 2/2001 | Chen et al. | |
| 6,623,881 B2 | 9/2003 | Badding et al. | 429/30 |
| 6,852,436 B2 | 2/2005 | Badding et al. | 429/32 |
| 2001/0044041 A1 | 11/2001 | Badding et al. | 429/32 |
| 2004/0028975 A1 | 2/2004 | Badding et al. | |
| 2005/0214621 A1* | 9/2005 | Liu et al. | 429/38 |

FOREIGN PATENT DOCUMENTS

| | | |
|---|---|---|
| JP | 04-345762 | 12/1992 |
| JP | 05-044071 | 2/1993 |
| JP | 2001-273914 | 10/2001 |
| WO | WO03/007403 A1 | 1/2003 |

OTHER PUBLICATIONS

Minh et al., Science and Technology of Ceramic Fuel Cells, Elsevier, p. 255 (1995).

The Corrosion Handbook, edited by Herbert H. Uhlig, pp. 698-719 (copyrighted 1948), (no month).

D.A. Porter et al, "Phase Transformations in Metals and Alloys" pp. 60-65 (1981, no month).

J. Crank "The Mathematics of Diffusion" 1 page (copyrighted 1956) (no month).

P. Shewon "Diffusion in Solids" pp. 56-61, 86-87 and 189-191 (copyrighted 1989) (no month).

* cited by examiner

# FUEL CELLS WITH ENHANCED VIA FILL COMPOSITIONS AND/OR ENHANCED VIA FILL GEOMETRIES

CROSS-REFERENCE TO RELATED APPLICATIONS

This application is a Continuation under 37 CFR 1.53(b) of U.S. patent application Ser. No. 10/422,356 filed on Apr. 24, 2003 now U.S. Pat. No. 7,378,173 the contents of which is relied upon and incorporated herein by reference in its entirety, and the benefit of priority under 35 U.S.C. §120 is hereby claimed.

This application is a Continuation-In-Part of U.S. parent application Ser. No. 09/858,124 filed on May 15, 2001, now U.S. Pat. No. 6,623,881, which claimed the benefit of U.S. provisional application Ser. No. 60/205,273 filed on May 18, 2001 both which are incorporated by reference herein.

BACKGROUND OF THE INVENTION

1. Field of the Invention

The present invention relates to fuel cells and, in particular, to a fuel cell formed from an electrode/electrolyte structure including at least one anode electrode and at least one cathode electrode disposed on opposing sides of an electrolyte sheet, the anode and cathode electrodes are electrically connected in series, parallel, or a combination thereof by at least one electrical conductor which has a specific composition and/or a specific geometry that traverses at least one via hole in the electrolyte sheet.

2. Description of Related Art

The demand for electricity has increased dramatically in the past few years and is expected to increase even more in the future, resulting in a need to come up with different ways to generate electricity. Gas turbines and diesel generators are some of the well known devices that can be used to generate electricity. However, gas turbines and diesel generators are not energy efficient nor are they environmentally sound. As such, fuel cells which can generate electricity in an efficient and environmentally sound manner have been the subject of a considerable amount of research in recent years.

The fuel cell described in the co-pending U.S. patent application Ser. No. 09/858,124 includes an electrolyte sheet interposed between anode electrodes and cathode electrodes. The anode electrodes are bonded to a first side of the electrolyte sheet and the cathode electrodes are bonded to a second side of the electrolyte sheet. The anode and cathode electrodes are in opposing positions across the electrolyte sheet to form electrochemical cells. The electrochemical cells are connected in electrical series, parallel, or a combination of series and parallel by electrical conductors that traverse via holes formed in the electrolyte sheet and contact the anode and cathode electrodes. The electrical conductors identified in the preferred embodiment of U.S. patent application Ser. No. 09/858,124 are relatively flat and made from silver-palladium alloys (e.g., 70% silver-30% palladium). Although the use of the flat silver-palladium electrical conductors disclosed in this patent application works well in most applications they can in some applications limit the durability of the fuel cell. Accordingly, there is a need for a fuel cell that utilizes electrical conductors which have a specific composition and/or a specific geometry that enhances the durability of the fuel cell. This need and other needs are addressed by the fuel cell and electrical conductors of the present invention.

BRIEF DESCRIPTION OF THE INVENTION

The present invention includes a fuel cell and a method for manufacturing the fuel cell formed from an electrode/electrolyte structure including an array of anode electrodes and cathode electrodes disposed on opposing sides of an electrolyte sheet, the anode and cathode electrodes being electrically connected in series, parallel, or a combination thereof by electrical conductors that traverse via holes in the electrolyte sheet. Several different embodiments of electrical conductors which have a specific composition and/or a specific geometry are described herein.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1-9, there are disclosed several different embodiments of electrical conductors that can be used in a fuel cell in accordance with the present invention. Although the fuel cells described below are solid oxide fuel cells ("SOFCs"), it should be understood that other types of fuel cells besides SOFCs can be used in the present invention.

Accordingly, the fuel cell and method for making the fuel cell in accordance with the present invention should not be construed in a limited manner.

Figure 1A:
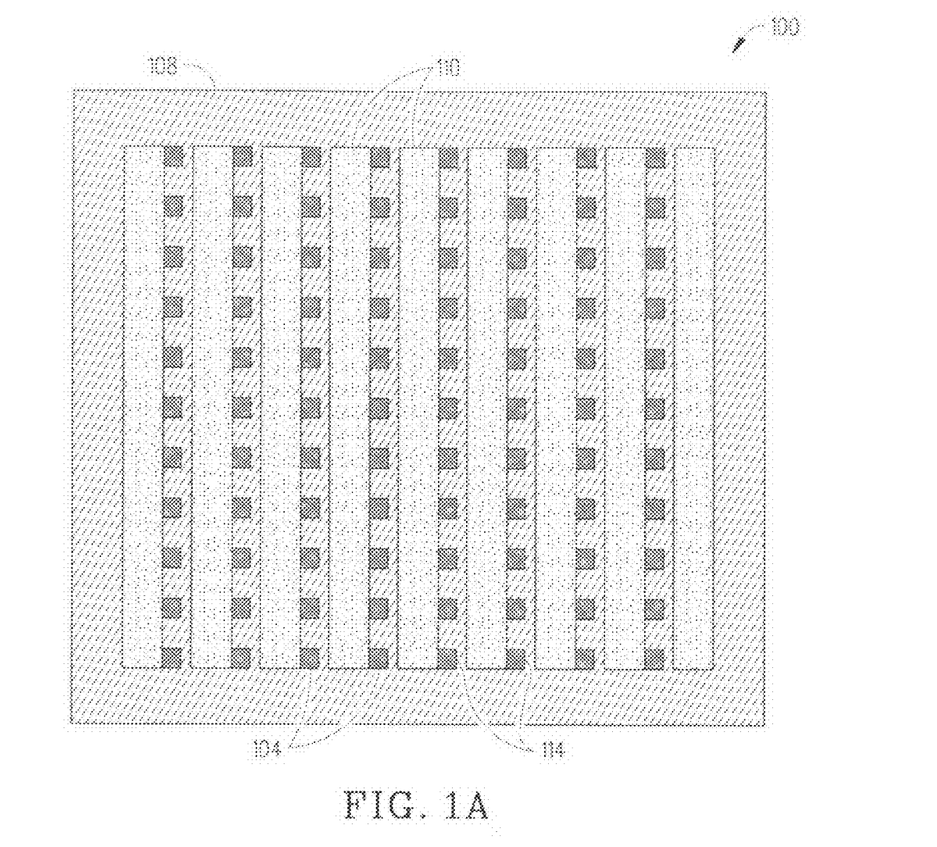
FIGS. 1A and 1B show a top view and a cross-sectional side view of a fuel cell that has a series of electrochemical cells which are connected to one another by electrical conductors that have enhanced compositions in accordance with two different embodiments of the present invention.
Figure 1B:
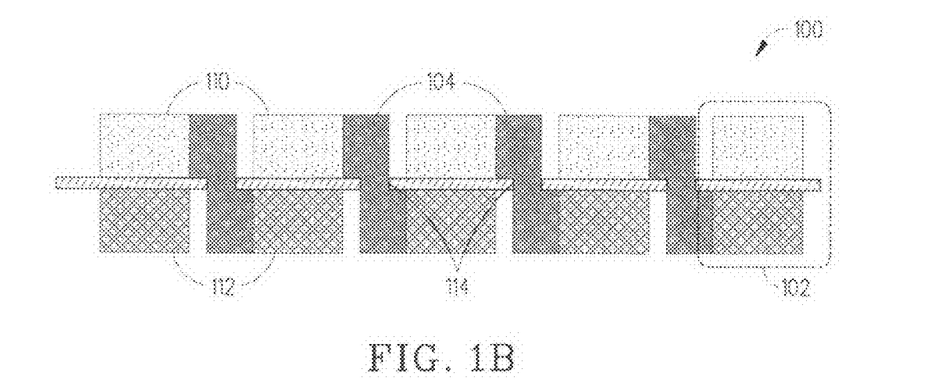

Referring to FIGS. 1A and 1B, there are shown a top view and a cross-sectional side view of a fuel cell 100 that has a series of electrochemical cells 102 which are connected to one another by electrical conductors 104 that have enhanced compositions in accordance with two different embodiments of the present invention. Basically, the fuel cell 100 is based on a thin, compliant electrode/electrolyte structure that offers improved cell design flexibility while retaining high strength, mechanical integrity, and resistance to thermal degradation from temperature cycling and thermal shock. The electrode/electrolyte structure includes a thin flexible solid oxide electrolyte sheet 108 that can be made from yttria-($Y_2O_3$) stabilized zirconia ($ZrO_2$) (for example). The electrode/electrolyte structure further includes an array of anode electrodes 110 (e.g., negative fuel electrodes 110) and cathode electrodes 112 (e.g., positive air electrodes 112) disposed on opposing sides of the electrolyte sheet 108. The anode electrodes 110 can be made from nickel-$ZrO_2$ cermet (for example). And, the cathode electrodes 112 can be made from strontium-doped lanthanum manganite {(LaSr)$MnO_3$} (for example). The electrodes 110 and 112 do not form continuous layers on the electrolyte sheet 108, but instead define multiple discrete regions or electrochemical cells 102. The electrochemical cells 102 are electrically interconnected in series, parallel, or a combination thereof by one or more electrical conductors 104 (e.g., via fillers, cell interconnects) that extend through via holes 114 in the electrolyte sheet 108 and contact the electrodes 110 and 112. Two different embodiments of the electrical conductors 104' and 104" which have enhanced compositions in accordance with the present invention are described in detail below.

In the first embodiment, the electrical conductor 104' has a composition of a precious/semi-precious metal and a ceramic. The preferred composition of the electrical conductor 104' is 20% volume or more of the precious/semi-precious metal that includes iridium, rhodium, platinum, ruthenium, palladium, gold, silver and metallic alloys thereof and at least 2% volume of the ceramic. The electrical conductor 104' contains preferably 5% volume and more preferably 20% volume of the ceramic. The ceramic can be particles sized below 10 microns, preferably 5 microns and more preferably 1 micron. The ceramic functions to increase the yield stress and the high temperature creep resistance of the precious/semi-precious metal. The preferred ceramic is lanthanum chromite ($LaCrO_3$).

The preferred microstructure of the electrical conductor 104' is a dense continuous phase of precious/semi-precious metal and isolated grains of ceramic particles. The electrical conductor 104' may also contain at least 0.5% volume of palladium to enhance the bonding to the electrolyte sheet 108. Moreover, it is preferred that the electrical conductor 104 have a thermal expansion between about $10 \times 10^{-6}/°$ C. and $14 \times 10^{-6}/°$ C. to reduce stress in the electrolyte sheet 108 at room temperature.

The precious/semi-precious metal and conductive ceramic composition of electrical conductor 104' functions to extend the thermal durability of the fuel cell 100. Because, the composition of the electrical conductor 104' is more refractory than the traditional electrical conductor which is made from silver-palladium (with 30% or less palladium). In addition, the composition of the electrical conductor 104' has a better thermal expansion match to the electrolyte sheet 108 than the traditional electrical conductors made from silver-palladium (with 30% or less palladium). Below is a description about an experiment conducted by the inventors which is associated with the first embodiment of the present invention.

PROPHETIC EXAMPLE #1

First Embodiment

Via holes 114 were punched in an unsintered tape cast electrolyte sheet 108 of zirconia 3-mole % yttria. The electrolyte sheet 108 was sintered at 1430° C. for 2 hours. The sintered electrolyte sheet 108 was about 20 microns thick and the via holes 114 were about 75 microns in diameter. Different composition ranges of $LaCrO_3$ with silver-palladium-platinum, gold-platinum-palladium, silver-palladium-rhodium, gold-rhodium-palladium and mixes thereof were made into inks and painted or screen printed into the via holes 114 to form electrical conductors 104'. The electrical conductors 104' were sintered for up to 2 hours in a temperature range of 800-1430° C. in air which was hot enough to form a gas tight seal and electrical continuity through the electrolyte sheet 108. The electrical conductors 104' made from cermets with up to 80% volume of $LaCrO_3$ and metallic alloy did not crack the electrolyte sheet 108. Cermets with greater than 95% volume of $LaCrO_3$ did not sinter to a gas tight seal in these temperature ranges. And, cermets with 65% volume of $LaCrO_3$ did not sinter to a gas tight seal. As such, it appears that the electrical conductors 104" made in accordance with the first embodiment provides a better hermetic seal at lower processing temperatures that pure $LaCrO_3$ electrical conductors.

In the second embodiment, the electrical conductor 104" has a composition that utilizes iridium, rhodium, platinum, ruthenium, palladium, gold, silver and their metallic alloys over limited composition ranges. These metallic compositions can also include a conductive ceramic (e.g., $LaCrO_3$). The preferred composition of the electrical conductor 104" includes platinum, rhodium or iridium and at least one metal selected from the group consisting of iridium, rhodium, platinum, ruthenium, palladium, gold, silver and alloys thereof. The preferred composition increases the refractoriness of the electrical conductor 104" and lowers the thermal expansion coefficient of the electrical conductor 104" so it more closely matches the thermal expansion coefficient of the electrolyte sheet 108. It is preferred that the electrical conductor 104" have a melting point greater than about 1000° C. It is further preferred that the electrical conductor 104" have a thermal expansion between about $10 \times 10^{-6}/°$ C. and $14 \times 10^{-6}/°$ C. to reduce stress in the electrolyte sheet 108 at room temperature. The electrical conductor 104" may also contain at least 0.5% volume of palladium to enhance the bonding to the electrolyte sheet 108.

The limited platinum, rhodium or iridium composition of the electrical conductor 104" also functions to extend the thermal durability of the fuel cell 100. Because, the platinum, rhodium or iridium compositions of the electrical conductor 104" are more refractory than the traditional electrical conductor which is made from silver-palladium (with 30% or less palladium). In addition, the compositions of the electrical conductor 104" have a better thermal expansion match to the electrolyte sheet 108 than the traditional electrical conductor made from silver-palladium (with 30% or less palladium). Below are described several experiments conducted by the inventors that are associated with the second embodiment of the present invention.

COUNTER EXAMPLE #1

Second Embodiment

Via holes 114 were punched in an unsintered tape cast electrolyte sheet 108 of zirconia 3-mole % yttria. The electrolyte sheet 108 was sintered at 1430° C. for 2 hours. The electrolyte sheet 108 was about 20 microns thick, and the via holes 114 were about 200 microns in diameter. A platinum ink with a texanol vehicle was used to fill the via holes 114 using a fine paint brush. The platinum electrical conductors were sintered for two hours in air at 1300° C. The 100% platinum electrical conductors produced substantial cracks in the electrolyte sheet 108 upon cooling due to the low CTE of the platinum electrical conductors with respect to the CTE of the electrolyte sheet 108. This expansion difference results in compressive stresses in the platinum electrical conductor and high tensile circumferential stresses in the electrolyte sheet 108 near the via hole 114. Thus, the electrolyte sheet 108 can fracture with the use of 100% platinum electrical conductors.

COUNTER EXAMPLE #2

Second Embodiment

Via holes 114 were punched in an unsintered tape cast electrolyte sheet 108 of zirconia 3-mole % yttria. The electrolyte sheet 108 was about 20 microns thick, and the via holes 114 were about 250 microns in diameter as punched. A platinum ink with 40% zirconia—3 mole % yttria using a texanol vehicle was used to fill the via holes 114 using fine paint brush and a square grid array was printed on the unfired electrolyte sheet 108. The electrolyte sheet 108, via fill and grid were then sintered at 1430° C. for 2 hours in air. The platinum-zirconia electrical conductors produced substantial cracks in the electrolyte sheet 108 upon cooling, while the grid on the surface did not.

EXAMPLE #1

Second Embodiment

Via holes 114 were punched in an unsintered tape cast electrolyte sheet 108 of zirconia 3-mole % yttria. The electrolyte sheet 108 was sintered at 1430° C. for 2 hours. The electrolyte sheet 108 was about 20 microns thick, and the via holes 114 were about 75 microns in diameter. A composition of 34% volume of gold, 50% volume of platinum and 16% volume of palladium was made into an ink and screen printed in the via holes 114 to form the electrical conductors 104". The electrical conductors 104" were sintered for up to 1 hour in a temperature range of 1350° C. in air, resulting in a gas tight seal and electrical continuity through the electrolyte sheet 108.

EXAMPLE #2

Second Embodiment

Via holes 114 were punched in an unsintered tape cast electrolyte sheet 108 of zirconia 3-mole % yttria. The electrolyte sheet 108 was sintered at 1430° C. for 2 hours. The electrolyte sheet 108 was about 20 microns thick, and the via holes 114 were about 75 microns in diameter.

Via pad print: an ink containing silver and 10% palladium was screen printed in the form of a via contact pad, dried and fired at 900° C. for 1 hour in air. A porous paper located underneath the via hole during printing was used to absorb any ink filling the hole—ensuring the via hole itself was not filled.

Via fill print: an ink containing 100% gold was screen printed over the fired 90% silver and 10% palladium via pads, in a pattern covering an area immediately about the via hole, dried and fired at 900° C. for 1 hour in air. A non-wetting surface (wax paper) was located underneath the via hole to promote filling by the gold ink. This technique and composition of the electrical conductor 104" resulted in a gas tight seal and electrical continuity through the electrolyte sheet 108.

PROPHETIC EXAMPLE #3

Second Embodiment

Via holes 114 were punched in an unsintered tape cast electrolyte sheet 108 of zirconia 3-mole % yttria. The electrolyte sheet 108 was sintered at 1430° C. for 2 hours. The electrolyte sheet 108 was about 20 microns thick, and the via holes 114 were about 75 microns in diameter. Different composition ranges of silver-palladium-platinum, gold-platinum-palladium, silver-palladium-rhodium, gold-rhodium-palladium and mixes thereof were made into inks and painted or screen printed into the via holes 114 to form the electrical conductors 104". The electrical conductors 104" were sintered for up to 2 hours in a temperature range of 1000-1400° C. in air, which was hot enough to give a gas tight seal and electrical continuity through the electrolyte sheet 108. The metallic alloys in the range of Pt-14% Au-6% Pd to Au-6.5% Pd which have $10–14\times10^{-6}/°$ C. thermal expansion coefficients did not crack the electrolyte sheet 108. Alloys outside this range did, because the thermal expansion coefficient was either too small or high which resulted in too high a yield stress in the electrolyte sheet 108.

As can be seen above, the platinum alloy electrical conductor 104" is more refractory than the traditional electrical conductors made from silver-palladium alloys. Moreover, the platinum alloy electrical conductor 104" has an improved thermal expansion match with the YSZ electrolyte sheet 108 (CTE ~11 ppm/° C.) when compared to a pure platinum electrical conductor. The CTEs and melting points of the aforementioned metals are listed in TABLE #1.

TABLE #1

| Metal | CTE (ppm/° C.) | Melting Point (° C.) |
|---|---|---|
| Iridium | 6.8 | 2447 |
| Rhodium | 8.3 | 1963 |
| Platinum | 9.1 | 1768 |
| Ruthenium | 9.1 | 2310 |
| Palladium | 11.6 | 1554 |
| Gold | 14.2 | 1064 |
| Silver | 19.7 | 962 |

Like in the first embodiment, the electrical conductor 104" can incorporate the addition of fine ceramic particles which when distributed well functions to increase the yield stress of metal alloys and to increase the high temperature creep resistance. Ceramic particles below 10 microns, preferably 5 microns and more preferably 1 micron can be used. It should also be understood that the composition of electrical conductor 104" can include metals that form oxides upon oxidation such as Nb or Zr.

Following are some other important aspects associated with the second embodiment of the electrical conductor 104":

The composition of the electrical conductor 104" which is a mixture of "low" CTE metals (Ir, Rh, Pt, Ru) and "high" CTE metals (Au, Ag) enables one to produce an electrical conductor 104" that has a CTE which is relatively close to the CTE of an YSZ electrolyte sheet 108 (CTE ~11 ppm/° C.).

Addition of palladium to the electrical conductor 104" can promote adherence between the electrical conductor 104" and the electrolyte sheet 108.

Electrical conductors 104" with a preferred CTE range of 10-14 ppm/° C. can be produced.

Electrical conductors 104" with a melting point of over 1000° C. can be produced.

Figure 2A:
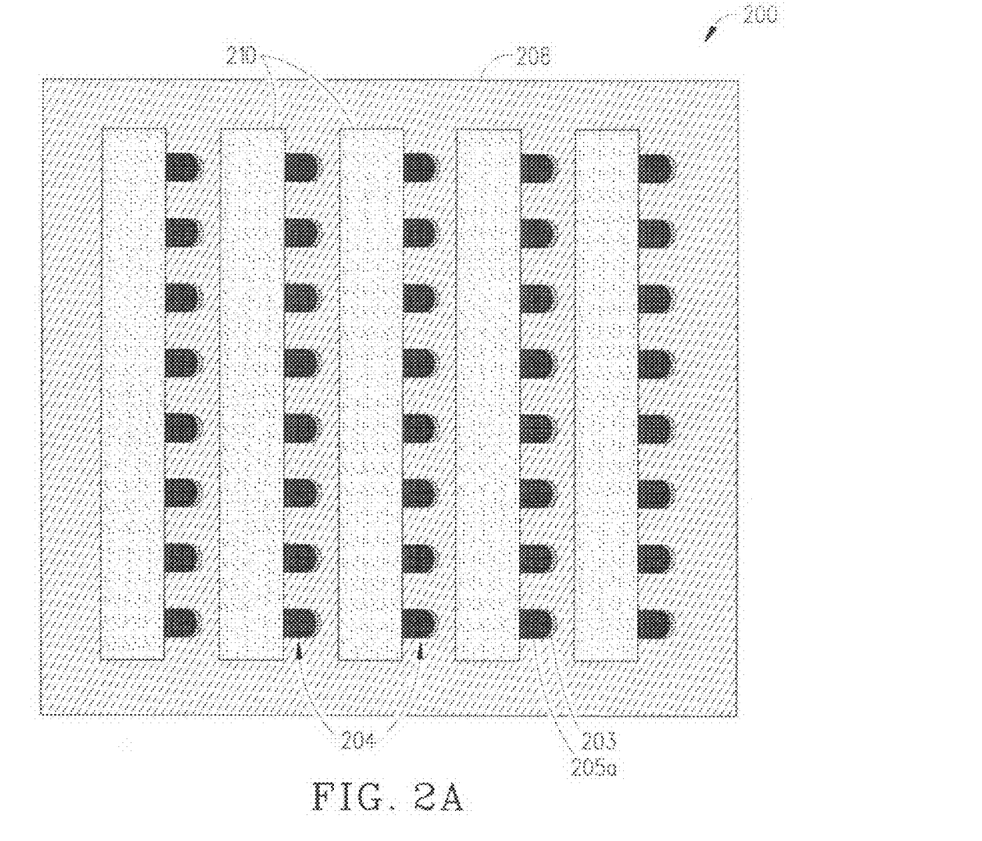
FIGS. 2A and 2B show a top view and a cross-sectional side view of a fuel cell that has a series of electrochemical cells which are connected to one another by electrical conductors that have enhanced geometries in accordance with a third embodiment of the present invention.
Figure 2B:
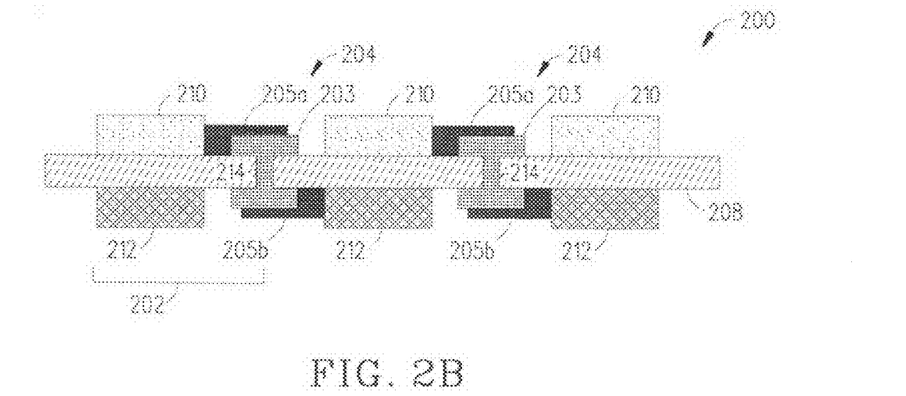
Figure 3:
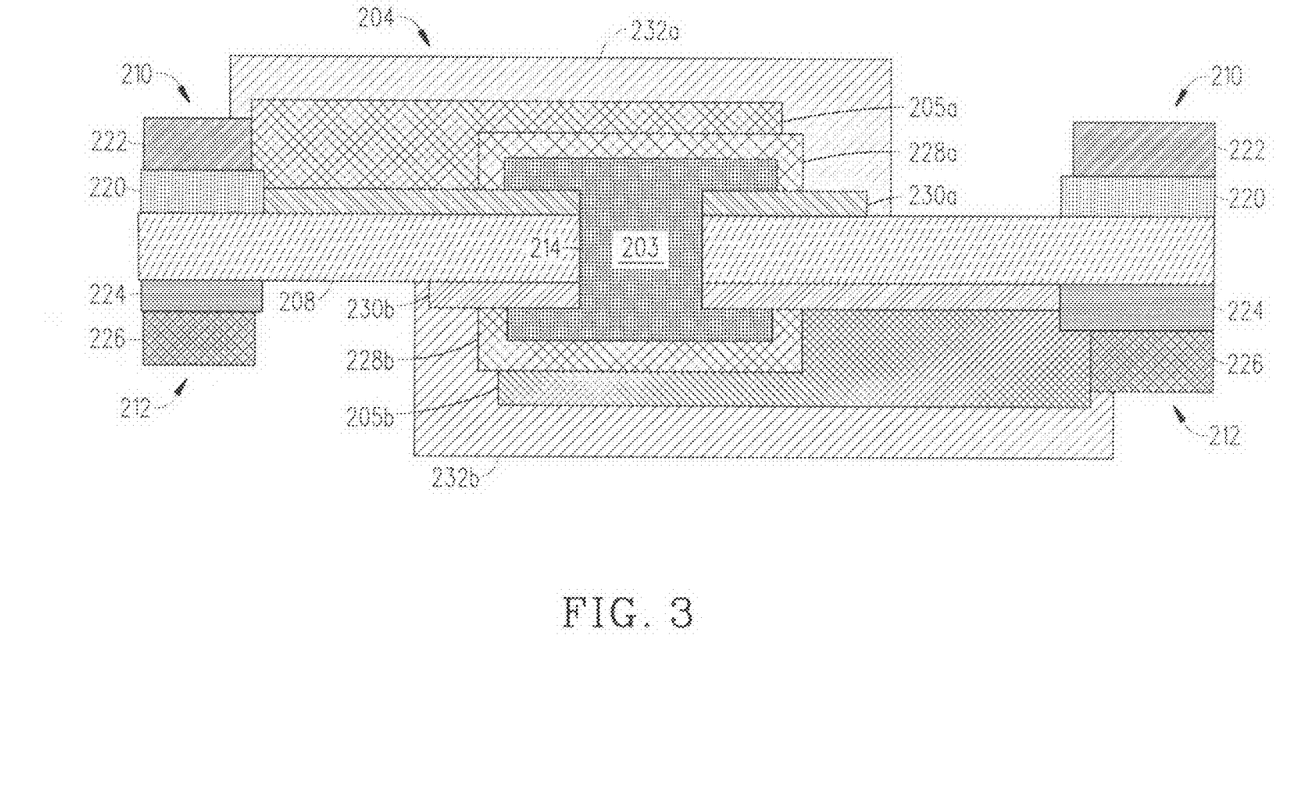
FIG. 3 is a cross-sectional side view detailing some additional component layers that may be incorporated within the fuel cell shown in FIGS. 2A and 2B.

Referring to FIGS. 2-3, there are shown different views of a fuel cell 200 that has a series of electrochemical cells 202 which are connected to one another by electrical conductors 204 that have enhanced geometries in accordance with a third embodiment of the present invention. As can be seen in FIGS. 2A and 2B, the fuel cell 200 is based on the electrode/electrolyte structure that includes the electrolyte sheet 208 that has disposed on opposing sides thereof an array of anode electrodes 210 and cathode electrodes 212. The electrodes 210 and 212 and electrolyte sheet 208 define multiple electrochemical cells 202. The electrochemical cells 202 are electrically interconnected in series, parallel, or a combination thereof by one or more electrical conductors 204 (e.g., via fillers, cell interconnects) that extend through via holes 214 in the electrolyte sheet 208 and contact the electrodes 210 and 212. The electrical conductors 204 are composite conductors and include a via fill material 203 and two via pad structures 205a and 205b. The via fill material 203 is located within and hermetically seals one of the via holes 114 in the electrolyte sheet 108. And, the two via pad structures 205a and 205b are attached to opposing ends of the via fill material 203 that extends from both sides of the via hole 114. As shown, the via pad structure 205a contacts the anode electrode 210 and one end of the via fill material 203. Likewise, the via pad structure 205b contacts the cathode electrode 212 and the other end of the via fill material 203.

An important aspect of this embodiment is that the via pad structures 205a and 205b are not in contact with the oxidizing and reducing conditions associated with the electrolyte sheet 208 like the via fill material 203. As such, the two via pad structures 205a and 205b can be made from a variety of materials that are less costly and have improved properties when compared to the materials used to make the via fill material 203. It should also be appreciated that the two via pad structures 205a and 205b can be integral outcroppings of the electrodes 210 and 212 and not separate prints as shown in FIGS. 2A and 2B.

FIGS. 2 and 3 show the electrical conductor 104 and 204 or the via pad structures 205a and 205b as discrete elements. Providing discrete conductors 104 and 204 reduces stress from CTE mismatch between the conductor and the electrolyte sheet 108 and 208. In another embodiment, electrical connection between the electrical conductor 104 and 204 and the electrodes 110, 112, 210 and 212 may be made by a continuous line of material, rather than discrete pads as shown in FIGS. 2 and 3. The appropriate choice can be made based on CTE match of the via pad material and the electrolyte material as well as cost considerations and the relative conductivity of the electrode material compared to the via pad material.

Referring to FIG. 3, there is a cross-sectional side view detailing some additional component layers that may be incorporated within the fuel cell 200 shown in FIGS. 2A and 2B. Depending on the materials selected to make the fuel cell 200, it may be beneficial to add some additional component layers. For instance, the anode electrode 210 may include a catalyst layer 220 and an electrically conductive current collector layer 222. Likewise, the cathode electrode 212 may include a catalyst layer 224 and an electrically conductive current collector layer 226. If an undesirable reaction occurs between the via fill material 203 and the via pad structures 205a and 205b, then conductive barrier layers 228a and 228b may be placed between the via fill material 203 and the via pad structures 205a and 205b. And, to improve the adherence of the via pad structures 205a and 205b to the electrolyte sheet 208 it may be desirable to add adherence layers 230a and 230b between the via pad structures 205a and 205b and the electrolyte sheet 208. Finally, to improve the robustness of the fuel cell 200 it may be desirable to provide protective barrier layers 232a and 232b on top of the entire structure of the electrical conductor 204.

It should also be appreciated that if the fuel cell 200 is made with certain metallic materials, then a problematical dendrite growth may occur between the edge of the via pad structures 205a and 205b and the corresponding electronically conductive current collector layers 222 and 226. The rate of dendrite growth depends upon the presence of an electrical field gradient which in this case is between the via pad structures 205a and 205b and the electronically conductive current collector layers 222 and 226. To help reduce the electrical field gradient experienced by mobile elements in the via pad structures 205a and 205b which may be for example, a silver alloy or cermet, the adherence layers 230a and 230b could be made from a conductive ceramic or refractory cermet. To further help reduce the electrical field gradient, the adherence layers 230a and 230b could be printed at least slightly proud of the edge of the via pad structures 205a and 205b. In this way, the conductive ceramic adherence layers 230a and 230b which are less prone to dendrite growth protects the via pad structures 205a and 205b from experiencing substantial electrical field gradients. Similarly, if the electronically conductive current collector layers 222 and 226 are made from an alloy susceptible to dendrite growth, then it is advantageous to print the current collector layers 222 and 226 at least slightly proud over the catalyst layers 220 and 224 which are made from a conductive ceramic or refractory cermet.

Following are some other important aspects associated with the third embodiment of the electrical conductor 204:

The electrical conductor 204 has via pad structures 205a and 205b which can be made from a wide variety of alternative materials that have improved properties or economics. Because, the via pad structures 205a and 205b are not in intimate contact with both oxidizing and reducing conditions like the via fill material 203.

The electrical conductor 204 provides a structure that enables the use of a wide variety of materials. For example, the traditional silver alloy electrical conductor may be economically replaced by noble metal alloys which contain platinum by providing a very small amount of the expensive platinum alloy as via fill material 203 and then making the via pad structures 205a and 205b out of a less expensive alloy, such as silver-palladium.

The via pad structures 205a and 205b on the anode side 210 and cathode side 212 may comprise different geometries (e.g. bell-shaped), structures, and material selections. For instance, the via pad structures 205a and 205b by being as thin as possible may help minimize the undesirable build up of thermal mass.

Following is a list of exemplary materials that can be used to make fuel cell 200:

Via fill material 203: Noble metal alloys, cermets. For example, Au—Pt—Pd or Au—Pt—Pd with a minority of Mg or Sr doped LaCrO3.

Electrolyte sheet 208: Yttria-doped zirconia (YSZ), gadolinia-doped ceria (GDC).

Anode via pad structure 205a: Ni/YSZ cermet, Ag alloy, Ag alloy cermet such as 90% Ag-10% with 40 volume % YSZ.

Cathode via pad structure 205b: Sr-doped LaMn (LSM), LSM/YSZ, Sr-doped LaCrO3 (LSC), silver alloy, silver cermet, noble metal alloys and cermets.

Anode barrier layer 228a: Ni/YSZ, Mg or Sr doped LaCrO3.

Cathode barrier layer 228b: LSM, LSM/YSZ, Mg or Sr doped LaCrO3.

Anode protective layer 232a: YSZ, Ni, other ceramics.

Cathode protective layer 232a: YSZ, LSM, LSC, other ceramics or glass-ceramics or glasses.

PROPHETIC EXAMPLE #1

Third Embodiment

This experiment relates to a solid oxide fuel cell 200 with multiple cells 202 and via interconnects 204. It illustrates how an exotic noble metal alloy via fill material 203 may be economically employed. The amount of via fill material 203 required is very small, and the contact between the electrodes 210 and 212 and the via fill material 203 is provided by using less expensive alloys in the via pad structures 205a and 205b (see FIGS. 2A and 2B).

Via holes 214 were punched in an unsintered tape cast electrolyte sheet 208 of zirconia 3-mole % yttria (3YSZ). The 3YSZ electrolyte sheet 208 was sintered at 1430° C. for 2 hours. The electrolyte sheet 208 was about 20 microns thick, and the via holes 214 were about 75 microns in diameter and spaced 2 mm apart. The spacing or via gallery between adjacent electrodes 210 and 212 was 2 mm. The space between the rows of electrical conductors 204 was 10 mm. An 8 mm wide Ni/YSZ anode catalyst layer 220 was screen printed on one side of the electrolyte sheet 208 such that layer 220 was centered between adjacent rows of via holes 214. A via fill 203 alloy consisting of Au—Pt—Pd was then printed on both sides of the sheet 208 such that the via hole 214 was completely filled and a layer with a circular region 200 um in diameter was provided. The via fill 203 alloy and the anode catalyst layer 220 were then co-fired at 1350° C. for 1 hour. A cathode catalyst layer 224 of LSM/YSZ was screen printed on the cathode side. The printed pattern included a bell-shaped outcropping from the electrode 212 which coated a region from the electrode edge to a distance 100 um proud of the edge of the via fill material 203. The LSM/YSZ outcropping provides a barrier layer for chemical protection of the via fill material 203. On the anode side, a similar bell shaped barrier layer is printed with Ni/YSZ precursor material. The entire structure is then sintered at 1200° C. for 1 hour. Next bell-shaped 90% silver-10% palladium via pad structures 205a and 205b were printed on both sides in such a way that they ended up being recessed by approximately 50 um from the edge of the barrier layers 228a and 228b. Finally, 90% silver-10% palladium with 40 volume % 3YSZ cermet current collectors 222 and 226 were printed on top of the anode and cathode catalyst layers 220 and 224 such that the current collectors 222 and 226 were slightly recessed from the edges of the catalyst layers 220 and 224 but still in contact with the via pad structures 205a and 205b. Recessing the current collectors 222 and 226 and via pads structures 205a and 205b as described above reduces the tendency for silver dendrite to grow between the via pads structures 205a and 205b and the adjacent electrodes 210 and 212. The current collectors 222 and 226 and via pad structures 205a and 205b where then co-fired at 900° C. for 1 hour. The resulting structure provides a functional solid oxide fuel cell 200 with multiple cells 202 on a chemically durable and refractory composite electrolyte/via membrane 204 and 208.

Figure 4A:
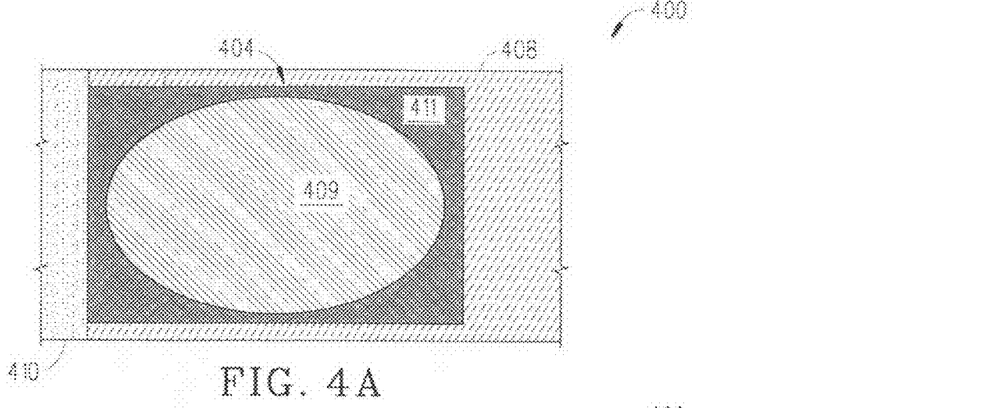
FIGS. 4A and 4B show a partial top view and a partial cross-sectional side view of a fuel cell that incorporates electrical conductors that have an enhanced geometry in accordance with a fourth embodiment of the present invention.
Figure 4B:
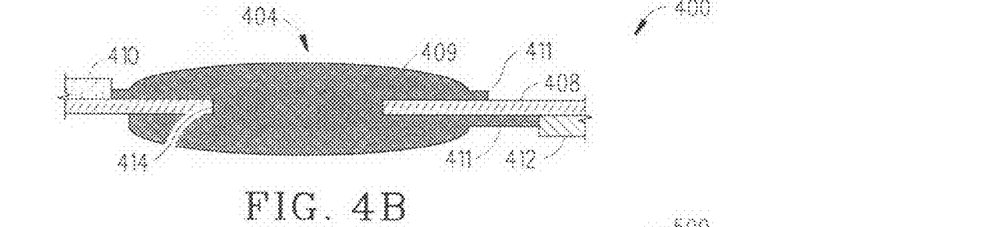
Figure 5A:
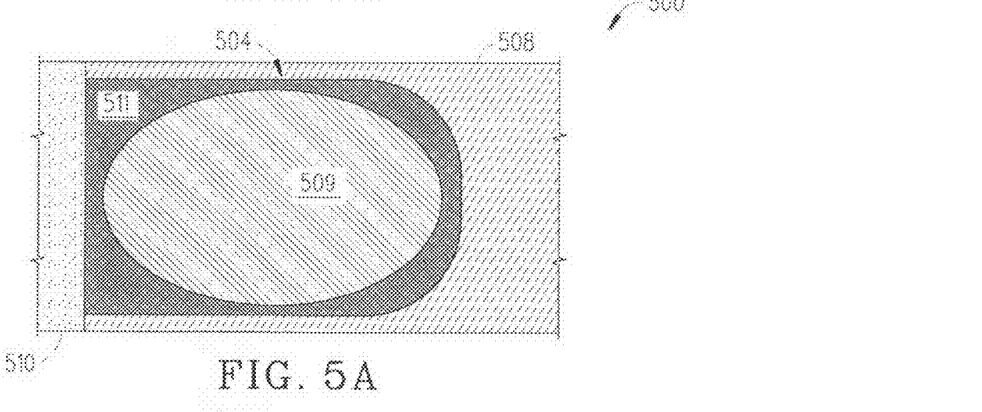
FIGS. 5A and 5B show a partial top view and a partial cross-sectional side view of an electrical conductor which has rounded edges instead of rectangular edges like the electrical conductor shown in FIGS. 4A and 4B.
Figure 5B:
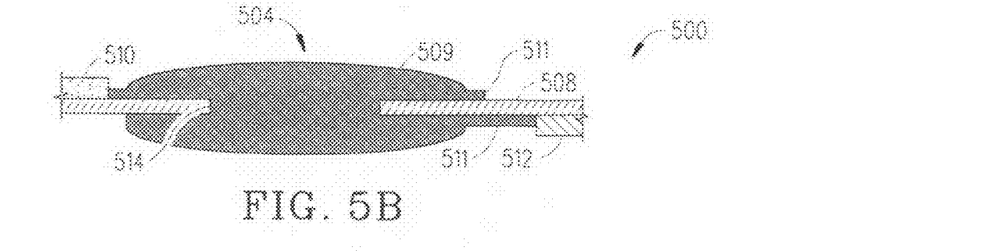

Referring to FIGS. 4 and 5, there are shown different views of a fuel cell 400 and 500 which incorporates electrical conductors 404 and 504 that have enhanced geometries in accordance with a fourth embodiment of the present invention. The fuel cell 400 and 500 is based on an electrode/electrolyte structure that includes the electrolyte sheet 408 and 508 that has disposed on opposing sides thereof an array of anode electrodes 410 and 510 and cathode electrodes 412 and 512. The electrodes 410, 412, 510 and 512 are electrically interconnected in series, parallel, or a combination thereof by electrical conductors 404 and 504 (e.g., via fillers, cell interconnects) that extend through via holes 414 and 514 in the electrolyte sheet 408 and 508 and contact the electrodes 410, 412, 510 and 512. The electrical conductors 404 and 504 in this embodiment can have the same composition and/or the same structure as any of the aforementioned electrical conductors 104', 104" and 204. Moreover, the electrical conductors 404 and 504 can have a composition like the traditional electrical conductors.

Referring to FIGS. 4A and 4B, the electrical conductor 404 has a relatively thick portion 409 that is located above and below the via hole 114 in the electrolyte sheet 408. This particular shape of the electrical conductor 404 functions to help reduce the current concentration at the "lip" of the via hole 114 and also to help reduce the high temperature creep effects. As can be seen, the electrical conductor 404 also has a flat portion 411 which functions to help minimize the expansion stress on the electrolyte sheet 408. In the preferred embodiment, the electrical conductor 404 has an overall thickness of greater than 5 microns but less than 100 microns with the thick portion 409 extending greater than 5 microns from the edge of the via hole 414 but less than 750 microns and preferably less than 500 microns.

The electrical conductor 404 as shown also has a geometry that is nearly symmetric across the electrolyte sheet 408 which also helps to minimize stress in the electrolyte sheet 408. In the preferred embodiment, the electrical conductor 404 has smooth edges and a rounded geometry in the plane and perpendicular to the plane of the electrolyte sheet 408 to further help reduce stress concentrations. This particular geometry of the electrical conductor 404 also functions to decrease the diffusion rate of hydrogen and oxygen through the filled via hole 414.

Referring to FIGS. 5A and 5B, the electrical conductor 504 shown is the same as electrical conductor 404 except that electrical conductor 504 has a round via pad structure 511 rather than the rectangular via pad structures associated with electrical conductors 104, 204 and 404 and traditional electrical conductors. The round via pad structure 511 of electrical conductor 504 functions to reduce stress in the electrolyte sheet 508. Moreover, the round via pad structure 511 of the electrical conductor 504 functions to reduce the current concentration in the fuel cell 500 because less material is needed to make the electrical conductor 504. As shown, the round via pad structure 511 can look like a parabola or a half-ellipse.

PROPHETIC EXAMPLE #1

Fourth Embodiment

A ten cell electrolyte sheet 408 and 508 with and a mix of thin and thick via pad/interconnect geometries was tested in hydrogen and air at 725° C. to 750° C. The ten cell electrolyte sheet 408 and 508 had two 5-10 micron thick porous ceramic metal electrode catalytic layers, where the anode catalyst had a composition of nickel and zirconia doped with yttria and the cathode catalyst had a composition of lanthanum strontium manganate and zirconia doped with yttria. The ten cell electrolyte sheet 408 and 508 also had two 5-10 micron thick current collectors, where the anode collectors had a composition of silver-10% palladium with alumina and the cathode collectors had a composition of dysprosium bismutate. The electrical conductors 404 and 504 has a composition of Ag-10% Pd. After several hours, the electrical conductors that were not thickened near and over the filled via hole 414 and 514 had failed, while the electrical conductors 404 and 504 with thickened areas near and over the via holes 414 and 514 had not failed. It is believed the thin areas failed because of the concentration of impurities and the formation of voids that may have been caused by hydrogen and oxygen diffusion and creep damage. The thicker areas 409 and 509 of electrical conductors 404 and 504 were more resistant to this damage.

PROPHETIC EXAMPLE #2

Fourth Embodiment

The inventors have conducted experiments where alloys of Pt—Au with some Pd (with and without oxide/ceramic additions) were used to fill the via hole 414 and 514 which were fairly well matched in thermal expansion to the electrolyte sheet 408 and 508, unlike Ag-10% Pd. During the experiments, it was noticed that the amount of Pt—Au—Pd alloy could be minimized to reduce cost. It was also noticed that the number and diameter of the via holes 414 and 514 and electrical conductors 404 and 504 could be minimized within the context of not increasing the resistance of the fuel cell 400 and 500 to enhance mechanical reliability and processing yields. These trends are believed to increase the current carried by the electrical conductors. The geometry of the electrical conductor 404 and 504 near the via hole 414 and 514 is important when one approaches high current densities. Because, the focusing of current can excessively heat the electrical conductor 404 and 504 and create lifetime and durability issues for the fuel cell 400 and 500. In addition, it was noticed that a problematical electro-migration effect might also arise. To address these concerns, the via pads and the thickened area of the electrical conductor 404 and 504 may be a mix of compositions, for example, silver-palladium may be used away from the via hole to reduce cost, but Pt—Au—Pd may be used in and near the via hole to increase the durability and lifetime of the fuel cell 400 and 500.

Figure 6A:
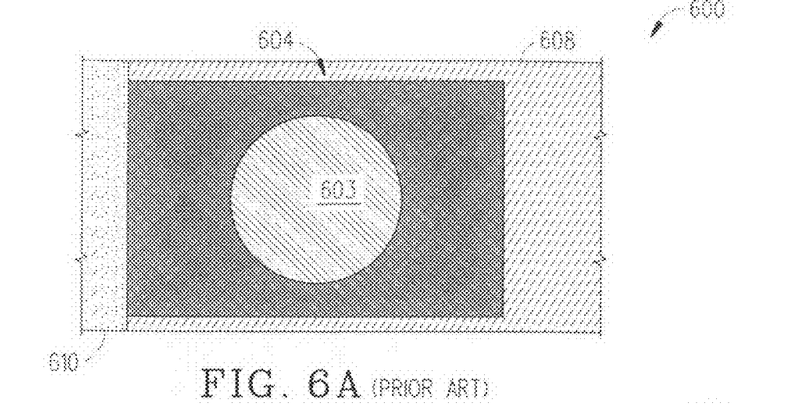
FIGS. 6A and 6B (PRIOR ART) show a partial top view and a partial cross-sectional side view of a traditional fuel cell which incorporates traditional electrical conductors that have problematical depressions on both sides thereof which are not present in the electrical conductors shown in FIGS. 4 and 5.
Figure 6B:
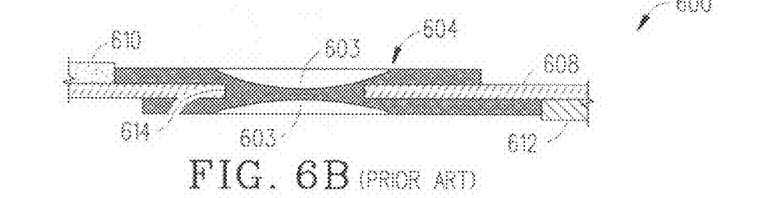

Referring to FIGS. 6A and 6B (PRIOR ART), it can be seen that the geometries of electrical conductors 404 and 604 are a marked improvement over the geometry of traditional electrical conductor 604. In one experiment, the traditional electrical conductor 604 had a composition of silver-10% palladium that was screen printed as an ink along with separate silver and (silver-30%) palladium particles all of which were homogenizd during sintering. The sintering was accomplished at about 850° C. for about ½ hour in air. The screen printing of the via fill and pads created electrical conductors 604 that were generally less than 5-10 microns thick. As can be seen, the electrical conductor 604 has a depression 603 on both sides of the electrolyte sheet 608 over the via hole 614. These depressions 603 are caused by the screen printing and sintering. Under some circumstances the geometry of this electrical conductor 604 has led to the opening of via holes 614 which resulted in the failure of the fuel cell 600.

Figure 7:
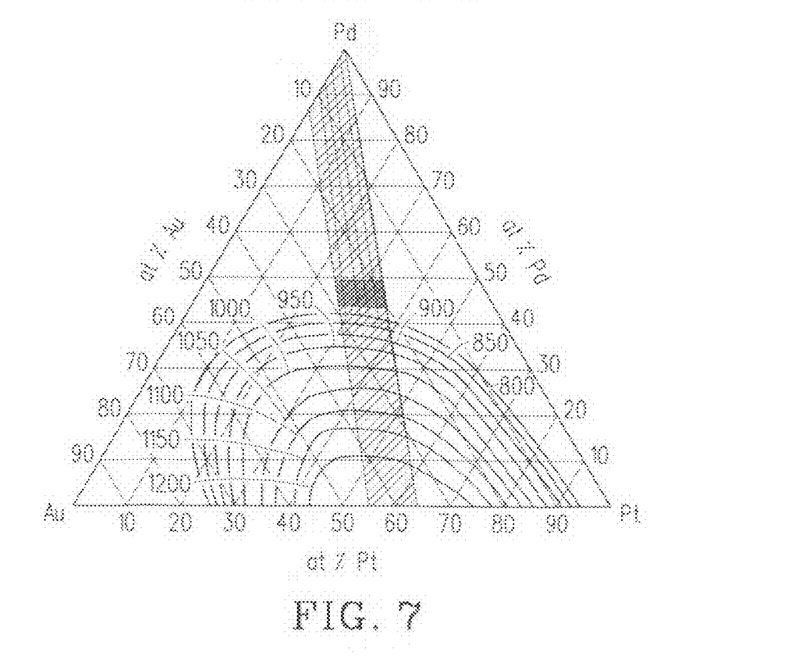
FIG. 7 is a phase diagram in atomic % that shows the region of the ternary Pt—Au—Pd system that can be used to make an electrical conductor in accordance with the present invention that has a thermal expansion coefficient (CTE) which closely matches the CTE of a YSZ electrolyte sheet.
Figure 8A:
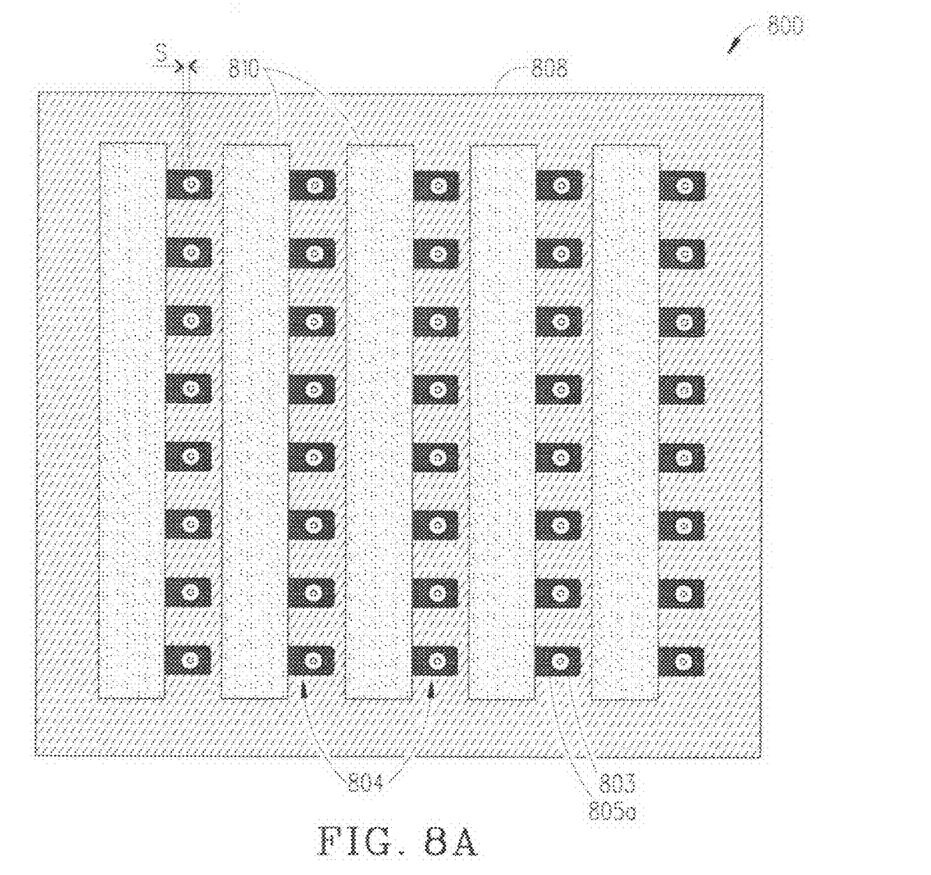
FIGS. 8A and 8B show a top view and a cross-sectional side view of a fuel cell that has a series of electrochemical cells which are connected to one another by electrical conductors that have enhanced geometries and compositions in accordance with a fifth embodiment of the present invention.
Figure 8B:
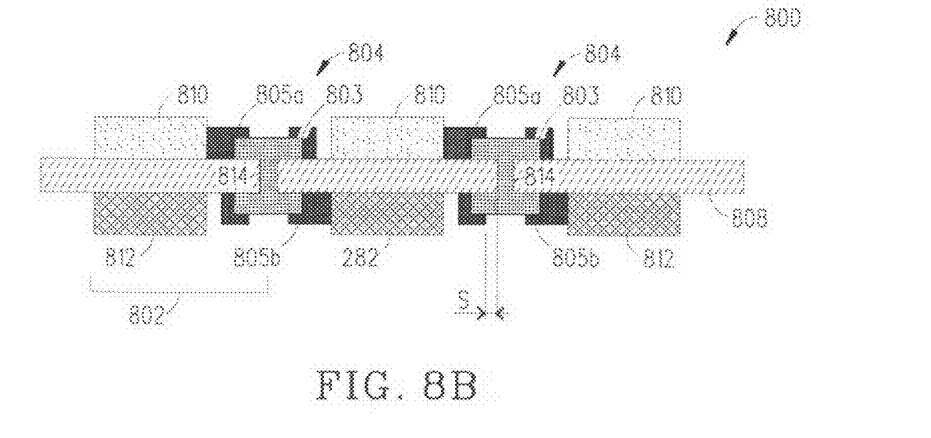
Figure 9A:
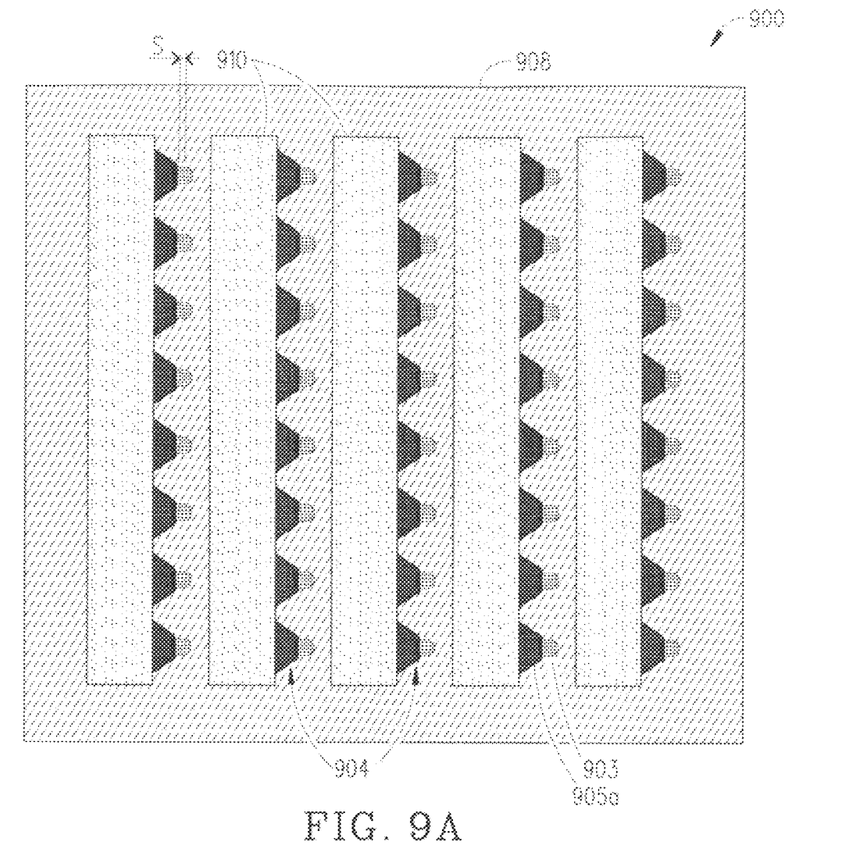
FIGS. 9A and 9B show a top view and a cross-sectional side view of a fuel cell that has a series of electrochemical cells which are connected to one another by electrical conductors that have enhanced geometries and compositions in accordance with a sixth embodiment of the present invention.
Figure 9B:
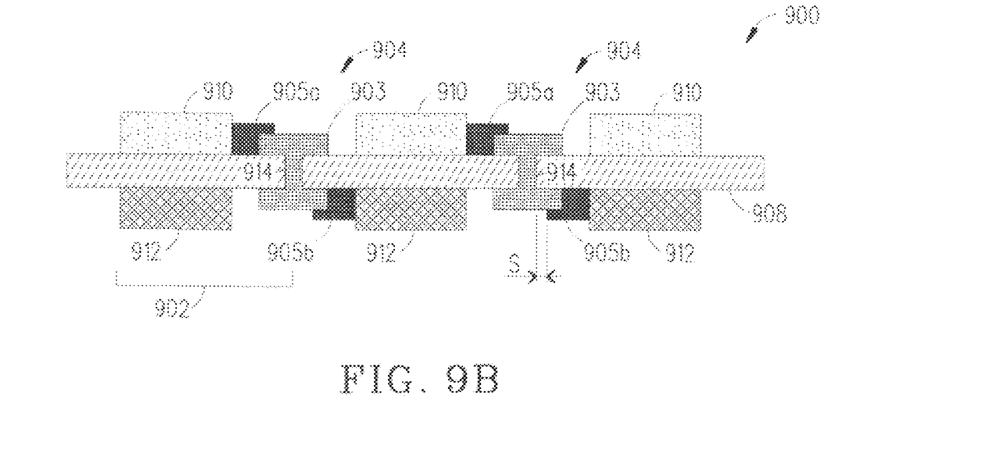

Referring to FIGS. 7-9, there are shown different diagrams including two fuel cells 800 and 900 that have a series of electrochemical cells 802 and 902 which are connected to one another by electrical conductors 804 and 904 that have enhanced compositions and geometries in accordance with two more embodiments of the present invention. It is well known that fuel cells made from traditional silver or silver-palladium electrical conductors can suffer from the problematical formation of blisters. This problem is caused because the silver or silver-palladium electrical conductors are exposed to an air environment on the cathode side and a hydrogen environment on the anode side. In this environment, silver and its alloys which have more than 60% silver "dissolve" appreciable amounts of both hydrogen and oxygen. The dissolved hydrogen or oxygen is not problematic, however dissolved hydrogen and oxygen is problematic. Because, the dissolved hydrogen and oxygen interact to form water (steam) within the electrical conductor which is insoluble and must escape as a vapor phase which in turn causes the formation of the problematical "blisters" (porosity).

To address this concern, the inventors have proposed that the electrical conductors be made from gold-rich, platinum-rich alloys or other alloys which do not dissolve appreciable amounts of oxygen. It is expected that silver and/or palladium may be employed in the alloy as long as their concentration is low enough so as to minimize the dissolution of hydrogen and oxygen.

Electrical conductors that are made from Pt—Au—Pd alloys are also attractive for several other reasons including for example:

The Pt—Au—Pd alloys have a CTE that is a close match to the CTE of the electrolyte sheet.

The Pt—Au—Pd alloys are more refractory.

It is also well known that fuel cells made from traditional silver-palladium electrical conductors may have a stressed electrolyte sheet. The stressing of the electrolyte sheet is caused because silver-palladium electrical conductors have a much higher thermal expansion coefficient (CTE) than the YSZ electrolyte sheet. However, since the silver-palladium electrical conductors are very ductile (soft), this stress may be relieved somewhat by plastic deformation of the metal. But, as described above traditional electrical conductors made from silver-palladium alloys suffer from other problems like the undesirable formations of blisters.

To address the blistering problem and at the same time address the deformation problem, the inventors have found that electrical conductors made from gold and gold-rich alloys that have a CTE as high as 14 ppm/° C. (pure Au) do not produce blisters or cracks at the via holes during thermal cycling. A lower expansion alloy of composition 80%-Pt 20%-Au with CTE-10.1 ppm/° C. also did not produce blisters or cracks in the electrolyte sheet. Hence the range of 10-14 ppm/° C. appears appropriate for Pt—Au alloys. It should be noted that this analysis does not take into account yield stress. FIG. 7 is a phase diagram in atomic % showing the region of the ternary Pt—Au—Pd alloy that has a very close CTE match to the YSZ electrolyte which has a CTE between 11-11.5 ppm/° C. For example, the highlighted Pt—Au—Pd alloy shown in FIG. 7 has Pd (45 atomic %), Pt (30 atomic %) and Au (25 atomic %) which corresponds to a CTE of 11.24 ppm/° C. Below are some possible characteristics on the Pt—Au—Pd via fill material that can be used to make electrical conductors:

Pt alloys that have a CTE>~10 ppm/° C.
Pt alloys with a melting point >1000° C. (could also choose melting point of Au-1064° C.).
Pt alloys that have a limited silver content to <50% (for example).

Since the silver-palladium alloy has a much lower cost and higher conductivity compared to the platinum-gold-palladium alloy, it would be desirable to utilize silver-palladium alloy for some components of the electrical conductor 804 and 904 and fuel cell 800 and 900. It is desirable, for example, to have a silver-palladium alloy via pad 805 and 905 in electrical contact with a Pt—Au—Pd via alloy fill 803 and 903 (see FIGS. 8-9). In such a design it would be further desirable to limit the contact between the Pt alloy and the Ag alloy since formation of a Pt—Ag alloy can be anticipated over time. An approximation of the extent of such a reaction, to first order, can be estimated by a diffusion rate analysis of Ag in Pt, Au, Pd and their alloys. A more detailed discussion about this diffusion rate is provided below after a detailed discussion about the fuel cells 800 and 900 shown in FIGS. 8 and 9.

The fuel cells 800 and 900 shown in FIGS. 8-9 illustrate exemplary geometries of via interconnects or electrical conductors 804 and 904 which help prevent undesirable chemical interactions with the other components of the fuel cells 800 and 900. Like above, each fuel cell 800 and 900 is based on the electrode/electrolyte structure that includes the electrolyte sheet 808 and 908 that has disposed on opposing sides thereof an array of anode electrodes 810 and 910 and cathode electrodes 812 and 912. The electrodes 810, 812, 910 and 912 and electrolyte sheet 808 and 908 define multiple electrochemical cells 802 and 902. The electrochemical cells 802 and 902 are electrically interconnected in series, parallel, or a combination thereof by electrical conductors 804 and 904 (e.g., via fillers, cell interconnects) that extend through via holes 814 and 914 in the electrolyte sheet 808 and 908 and contact the electrodes 810, 812, 912 and 912.

The electrical conductors 804 and 904 are composite conductors and include a Pt—Au—Pd alloy via fill material 803 and 903 and two Ag—Pd alloy via pad structures 805a, 805b, 905a and 905b. The Pt—Au—Pd alloy via fill material 803 and 903 is located around and within one of the via holes 814 and 914 in the electrolyte sheet 808 and 908. The Ag—Pd alloy via pad structures 805a, 805b, 905a and 905b are attached to opposing ends of the Pt—Au—Pd alloy via fill material 803 and 903 that extends from both sides of the via hole 814 and 914. As shown, the Ag—Pd alloy via pad structure 805a and 905a contacts the anode electrode 810 and 910 and one end of the Pt—Au—Pd alloy via fill material 803 and 903. Likewise, the Ag—Pd alloy via pad structure 805b and 905b contacts the cathode electrode 812 and 912 and the other end of the Pt—Au—Pd alloy via fill material 803 and 903.

As shown in FIGS. 8 and 9, the contact between the Ag—Pd via pads 805a, 805b, 905a and 905b and a Pt—Au—Pd via fill 803 and 903 is made at a distance from the via hole 814 and 914 that is sufficient to ensure little Ag (if any) may reach the via hole over the designed lifetime of the fuel cell 800 and 900. Therefore, the via fill material 803 and 903 remains refractory and not subject to porosity formation as silver and silver palladium alloys are prone. The appropriate design distance or size of the via fill 803 and 903 depends on the diffusion rate of Ag in the particular Pt—Au—Pd alloy. It is believed that this distance is substantially greater than the thickness of the electrolyte sheet 808 and 908.

While not wishing to be bound by diffusion theory, a brief discussion about diffusion theory in solids is provided which can help one to determine the appropriate size of the via fill 803 and 903. It is known that the atoms in a crystal oscillate around their equilibrium positions, and occasionally the oscillation is large enough to allow an atom to change sites. It is these jumps from one site to another that give rise to diffusion in solids. There are two main mechanisms of diffusion in solids—substitutional and interstitial. In the substitutional mechanism, the diffusing atom occupies a site on the crystal matrix and diffuses by jumping into a vacancy (i.e. an unoccupied lattice site). In the interstitial mechanism, the diffusing atom occupies an interstitial site and diffuses by jumping from one interstitial site to another. Additionally, for the purpose of measurement and discussion, diffusion can be divided into three main types: (i) tracer diffusion, $D^*$-diffusion of a tracer into a pure metal or homogeneous alloy, (ii) diffusion, $\tilde{D}$-diffusion of a solute in a pure metal, and (iii) interdiffusion, D-diffusion of two metals which form substitutional solid solutions. Although it is well-known that the diffusion coefficient is influenced many things (e.g. crystal orientation, presence of grain boundaries, concentration of diffusing species, stress, etc.), for this analysis it is assumed that the diffusion coefficient is a function of temperature only, and can be expressed by an Arrhenius-type equation:

$$D = A\exp(-Q/RT)$$

Furthermore, the simplest relationship between D, time, and distance was assumed:

$$x = (Dt)^{1/2}$$

In other words, in estimating the diffusion distance, x, no geometry factors are taken into account, and concentration effects are ignored. Although these simplifications impose limitations on the analysis, so long as the simplifications are kept in mind, the results provide useful design guidance for metal/alloy combinations for via fill, via pad, and current collector.

Again, the basic problem to be solved in this embodiment was to provide an electrical conductor 804 and 904 with a structure that avoids excessive accumulation of silver in the via fill 803 and 904 near the hole 814 and 914. TABLE 2 shows the dependence of x on the magnitude of D at the end of a design lifetime of 50,000 hours. These estimates of diffusion distance provide a guide to suitable contact geometries of electrical conductors 804 and 904—for example, the distance, "s", between the edge of the via hole 814 and 914 and the edge of the perimeter of the via pad/via fill contact, as indicated in FIGS. 8 and 9. For example, given a diffusion coefficient of $10^{-11}$ cm$^2$/sec, "s" should be equal to, or more than, about 0.4 mm.

TABLE 2

| log D (cm$^2$/s) | x @ 50K hours (μm) |
|---|---|
| −8 | 13416.4 |
| −9 | 4242.6 |
| −10 | 1341.6 |
| −11 | 424.3 |
| −12 | 134.2 |
| −13 | 42.4 |
| −14 | 13.4 |
| −15 | 4.2 |

The following discussion is about the evaluation of the interdiffusion behavior and identification of fast diffusing couples and potential problem areas. At 725° C. the metal/alloy diffusion coefficients are ranked as shown in TABLE 3.

The following trend is apparent: D(Au/Ag in high Au/Ag)>D(Pt/Pd in high Au/Ag)~D(Au/Ag in high Pt/Pd)>D(Pt/Pd in high Pt/Pd), where D(Au or Ag in high Au/Ag)>>D(Pt or Pd in high Pt/Pd).

TABLE 3

| System | D(725C) [cm2/sec] | D(850C) [cm2/sec] | Type of D |
|---|---|---|---|
| Ag in Au | 1.13E−10 | 1.08E−09 | D* |
| Ag in Ag | 9.31E−11 | 1.21E−09 | D* |
| Au in Au | 5.12E−11 | 5.07E−10 | D* |
| Au in 95Au—5Pt | 3.30E−11 | 4.27E−10 | D |
| Ag in 90Ag—10Pd | 3.20E−11 | 3.72E−10 | D |
| Au in Ag | 2.27E−11 | 3.41E−10 | D* |
| Au in 85Au—15Pd | 7.28E−12 | 5.94E−11 | Ď |
| Pd in Ag | 3.57E−12 | 8.62E−11 | D* |
| Au in 50Au—50Pd | 3.25E−12 | 2.52E−11 | Ď |
| Pt in Ag | 2.07E−12 | 5.06E−11 | D* |
| Pd in 90Ag—10Pd | 1.75E−12 | 4.35E−11 | D |
| Au in 20Pt—80Au | 3.87E−13 | 8.49E−12 | Ď |
| Pt in Au | 3.49E−13 | 1.07E−11 | D* |
| Pt in 95Au—5Pt | 1.34E−13 | 2.78E−12 | D |
| Au in Pt | 8.51E−15 | 2.50E−13 | D* |
| Au in 92Pt—8Au | 7.22E−15 | 2.42E−13 | Ď |
| Ag in Pt | 3.99E−15 | 1.27E−13 | D* |
| Pd in Pd | 2.51E−15 | 8.90E−14 | D* |
| Pt in Pt | 3.99E−16 | 1.83E−14 | D* |

It should be appreciated that the electrical conductors 804 and 904 which have a composite structure—enjoy the benefits of a via interconnect structure which utilizes a minimum amount of expensive, but refractory Pt—Au—Pd alloy as the via fill material 803 and 903 while the via pads 805 and 905 utilize a substantially of lower cost, high conductivity silver alloy. Such a composite structure could not be effectively implemented simply by printing the Ag—Pd alloy pad directly over the Pt—Au—Pd via fill due to the relatively fast diffusion of Ag from the pad into the fill. It is anticipated such diffusion would result in a Ag-rich via fill alloy which would suffer from the porosity/blister formation problem described above.

The information in TABLES 2 and 3 provides guidance for the appropriate perimeter via contact design for a given set of via fill 803 and 903 and via pad 805 and 905 couples. While the available data does not explicitly cover all systems of interest, reasonable approximations may be assessed. For example the diffusion rate of silver in a 50Pt-30Au-20Pd alloy is certainly lower than Ag in 90Ag10Pd, but higher than Ag in pure Pt. At 725° C., that would indicate a diffusion coefficient in the range between $3.2 \times 10^{-11}$ and $3.99 \times 10^{-15}$. Taking $10^{-12}$ as a conservative approximation, the separation distance "s" (FIGS. 8 and 9) should be at least about 135 µm.

It should be readily appreciated that different geometries of electrical conductors 804 and 904 are conceivable in addition to the ones shown in FIGS. 8 and 9. Again, the basic idea described in this section was to cover the concept that the contact between the via fill 803 and 903 and via pad 805 and 905 may be made at a distance from the edge of the via hole 814 and 914 to avoid corrupting the via fill 803 and 903.

Although the aforementioned embodiments of the present invention concerns improved via interconnects in an SOFC design having an array of electrodes on one electrolyte sheet, it should be understood that the same via fill alloys and similar structures of the present invention may be beneficially applied to other SOFC designs. For example, a planar fuel cell having a bipolar interconnect plate can use any one of the embodiments of the aforementioned electrical conductors. In particular, the planar fuel cell can have an interconnection that is facilitated by providing via holes in a separator plate, and the via holes are filled with a conductive metal or cermet like the robust Pt alloy via fill materials and contact geometries disclosed herein. An example of such a planar fuel cell plate that can be enhanced by using the electrical conductors of the present invention has been described in PCT WO 03/007403 which is hereby incorporated by reference herein.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A fuel cell formed from at least one anode electrode and at least one cathode electrode disposed on opposing sides of a planar electrolyte sheet, the at least one anode and cathode electrodes being electrically connected to one another by at least one electrical conductor traversing at least one via hole in the electrolyte sheet, wherein said at least one electrical conductor is made from two or more precious/semi-precious elements selected from the group consisting of iridium, rhodium, platinum, ruthenium, palladium or gold and includes a via fill material located within and around said at least one via hole in the electrolyte sheet such that the via fill material extends from both sides of said at least one via hole.

2. The fuel cell of claim 1, wherein said at least one electrical conductor includes two via pad structures, at least one of which is made of a different material than said via fill material, wherein the two via pad structures are attached to opposing ends of the via fill material that extend from both sides of said at least one via.

3. A fuel cell formed from at least one anode electrode and at least one cathode electrode disposed on opposing sides of a planar electrolyte sheet, the at least one anode and cathode electrodes being electrically connected to one another by at least one electrical conductor traversing at least one via hole in the electrolyte sheet, wherein said at least one electrical conductor is made from three or more precious/semi-precious elements selected from the group consisting of iridium, rhodium, platinum, ruthenium, palladium, gold or silver and includes a via fill material located within and around said at least one via hole in the electrolyte sheet such that the via fill material extends from both sides of said at least one via.

4. The fuel cell of claim 3, wherein said at least one electrical conductor includes two via pad structures, at least one of which is made of a different material than said via fill material, wherein the two via pad structures are attached to opposing ends of the via fill material that extend from both sides of said at least one via.

5. A solid oxide fuel cell comprising an electrode/electrolyte structure, the electrode/electrolyte structure comprising: a planar electrolyte sheet incorporating a plurality of anode and cathode electrodes located on opposing sides of the electrolyte sheet, the anode and cathode electrodes being electrically connected in series, parallel, or a combination thereof by electrical conductors traversing via holes in the electrolyte sheet wherein each electrical conductor includes a via fill material located within and around the via holes in the electrolyte sheet such that the via fill material extends from both sides of each via hole, and each electrical conductor is formed from at least one of the following:
(i) a cermet of a precious/semi-precious metal and a ceramic;

(ii) platinum, rhodium or iridium and at least one other metal selected from the group consisting of iridium, rhodium, platinum, palladium, gold, silver and alloys thereof.

6. The solid oxide fuel cell of claim 5, wherein each electrical conductor is a cermet of at least 20% volume or more of a precious/semi-precious metal and at least 2% volume of a ceramic.

7. The solid oxide fuel cell of claim 6, wherein:
said precious/semi-precious metal includes at least one metal selected from iridium, rhodium, platinum, ruthenium, palladium, gold, silver and alloys thereof; and
said ceramic includes lanthanum chromite.

8. The solid oxide fuel cell of claim 6, wherein said precious/semi-precious metal includes at least 0.5% volume of palladium.

9. An electrode/electrolyte structure for a device comprising: a planar electrolyte sheet incorporating a plurality of anode and cathode electrodes located on opposing sides of the electrolyte sheet, the anode and cathode electrodes being electrically connected in series, parallel, or a combination thereof by electrical conductors traversing via holes in the electrolyte sheet. wherein each electrical conductor is made from at least two materials and includes (i) a via fill material and (ii) two via pad structures, at least one of which is made of a different material than said via fill material, wherein said via fill material is located within and around one of the via holes in the electrolyte sheet and the two via pad structures are attached to opposing ends of the via fill material that extend from both sides of the via holes.

10. The solid oxide fuel cell of claim 9, wherein the via fill materials are Pt—Au—Pd alloys and at least one of the two via pads is a Ag—Pd alloy and the via fill material extends around the via hole a predetermined distance to prevent the formation of blisters.

11. The solid oxide fuel cell of claim 9, wherein each electrical conductor includes a relatively thick portion that is located (i) over and (ii) near the via holes in the electrolyte sheet over a portion of the electrolyte sheet surrounding the via holes.

12. The solid oxide fuel cell of claim 9, wherein each electrical conductor is made from a platinum-gold alloy which prevents formation of blisters.

13. The solid oxide fuel cell of claim 9, wherein each electrical conductor has a thermal expansion coefficient similar to a thermal expansion coefficient of the electrolyte sheet to reduce stress during thermal cycling.

14. The solid oxide fuel cell of claim 9, wherein each electrical conductor includes a relatively thick portion that is located inside, over, and near the via holes in the electrolyte sheet.

15. The solid oxide fuel cell of claim 14, wherein said thick portion has a thickness greater than 5 microns but less than 100 microns.

16. The solid oxide fuel cell of claim 14 wherein said thick portion extends more than 5 microns but less than 750 microns from an edge of one of the via holes in the electrolyte sheet.

17. The solid oxide fuel cell of claim 9 wherein each electrical conductor is made from platinum, rhodium or iridium and at least one other metal selected from the group consisting of iridium, rhodium, platinum, palladium, gold, silver and alloys thereof 18. The electrode/electrolyte structure according to claim 17 wherein each electrical conductor includes at least 0.5% volume of palladium.

19. The electrode/electrolyte structure of claim 17, wherein each electrical conductor further includes a conductive ceramic.

20. The electrode/electrolyte structure according to claim 9 wherein said electrical conductor is platinum-gold-palladium alloy with greater than about 10% of gold and less than about 50% palladium.

* * * * *